United States Patent
Bensch et al.

(10) Patent No.: US 8,152,243 B2
(45) Date of Patent: Apr. 10, 2012

(54) ELECTRICALLY CONTROLLED BRAKE SYSTEM

(75) Inventors: Uwe Bensch, Hannover (DE); Henning Förster, Nordstemmen (DE); Jörg Helmer, Birmingham, MI (US); Bernd-Joachim Kiel, Wunstorf (DE); Hartmut Rosendahl, Hannover (DE); Otmar Struwe, Hannover (DE); Matthias Tiedtke, Hannover (DE)

(73) Assignee: WABCO GmbH, Hannover (DE)

( * ) Notice: Subject to any disclaimer, the term of this patent is extended or adjusted under 35 U.S.C. 154(b) by 1255 days.

(21) Appl. No.: 11/880,117

(22) Filed: Jul. 19, 2007

(65) Prior Publication Data

US 2008/0030068 A1    Feb. 7, 2008

(30) Foreign Application Priority Data

Aug. 5, 2006    (DE) .................. 10 2006 036 748

(51) Int. Cl.
*B60T 13/00* (2006.01)
(52) U.S. Cl. ........................................ 303/7; 188/3 R
(58) Field of Classification Search .................. 303/3, 7, 303/14, 15, 20, 28–30, 40; 188/3 R, 3 H, 188/112 A, 112 R
See application file for complete search history.

(56) References Cited

U.S. PATENT DOCUMENTS

| | | | | |
|---|---|---|---|---|
| 3,582,149 A * | 6/1971 | Berg | ................. | 303/7 |
| 3,951,464 A * | 4/1976 | Donahue et al. | ................. | 303/7 |
| 4,900,098 A | 2/1990 | Kuhn et al. | | |
| 5,000,519 A * | 3/1991 | Moore | ................. | 303/7 |
| 5,042,883 A * | 8/1991 | McCann et al. | ................. | 303/7 |
| 5,380,072 A * | 1/1995 | Breen | ................. | 303/7 |
| 6,752,472 B2 * | 6/2004 | Bezzina | ................. | 303/7 |
| 7,905,557 B2 * | 3/2011 | Frank et al. | ................. | 303/118.1 |
| 2001/0033105 A1 * | 10/2001 | Frank et al. | ................. | 303/20 |
| 2005/0029859 A1 * | 2/2005 | Bensch et al. | ................. | 303/89 |
| 2005/0110342 A1 * | 5/2005 | Eberling et al. | ................. | 303/115.1 |
| 2007/0102996 A1 * | 5/2007 | Kelly et al. | ................. | 303/3 |
| 2009/0256416 A1 * | 10/2009 | Bensch et al. | ................. | 303/17 |

FOREIGN PATENT DOCUMENTS

| | | |
|---|---|---|
| DE | 101 32 413 A1 | 1/2003 |
| DE | 101 32 493 A1 | 1/2003 |
| WO | WO 03/004333 A1 | 1/2003 |

* cited by examiner

*Primary Examiner* — Christopher Schwartz
(74) *Attorney, Agent, or Firm* — Kramer Levin Naftalis & Frankel LLP

(57) ABSTRACT

An electrically controlled brake system 10 for a tractor is provided that is equipped with an anti-jackknifing brake that can be actuated by means of a manual operating element and that acts only on the brakes of a trailer coupled to the tractor. The operating element is an electrical element which generates an electrical signal to control a valve device by means of which the braking force of the anti-jackknifing brake can be increased.

38 Claims, 9 Drawing Sheets

ELECTRICALLY CONTROLLED BRAKE SYSTEM

BACKGROUND OF THE INVENTION

The present invention is directed generally to a new electrically controlled brake system for a tractor, the system including a manually actuatable anti-jackknifing brake that acts only on the brakes of a trailer connected to the tractor.

Brake systems with anti-jackknifing brakes are known. Anti-jackknifing brakes are used, for example, to maintain appropriate spacing on downhill grades between the tractor and the trailer in a vehicle train. Such anti-jackknifing brakes are also used advantageously on level driving surfaces. Further, anti-jackknifing brakes are useful for testing the braking effect of the trailer. Further still, the connection of the tractor to the trailer can also be tested with anti-jackknifing brakes.

In conventional brake systems with anti-jackknifing brakes, the service brake of the trailer is actuated via a manual lever in the vehicle operator's cab in order to brake only the trailer (the tractor is not braked during manual actuation of the lever). Such conventional anti-jackknifing brakes are, however, pneumatically actuated. For this purpose, the manual lever in the operator's cab is in pneumatic communication with the brake system. This is a disadvantage since compressed-air lines must be installed in the operator's cab, which therefore makes the brake system more expensive. Also, more stringent safety requirements must be satisfied when compressed-air lines are routed in an operator's cab, also contributing to the greater cost. Furthermore, the routing of compressed-air lines in an operator's cab imposes a considerable demand for space in the cab, at the expense of the operator's comfort.

It is, accordingly, desired to provide an improved brake system with an anti-jackknifing brake function.

SUMMARY OF THE INVENTION

Generally speaking, in accordance with the present invention, a brake system with an anti-jackknifing brake function is provided wherein the operating element is a manually operable electrical operating element which generates an electrical signal to control a valve device which influences the braking force of the anti-jackknifing brake.

By the use of an electrical operating element to control the anti-jackknifing brake, the installation of compressed-air lines in the operator's cab can be avoided. It is necessary only to route electrical lines, which are substantially more flexible, more space-saving and less expensive. The electrical operating element can be disposed in the operator's cab such that it can be manually operated without difficulty by the operator, and be independent of the foot brake pedal by means of which the service brake of the vehicle is actuated.

The electrical operating element generates an electrical signal, which, either directly or after pre-processing in a suitable control device, operates a valve device by means of which the braking force of the anti-jackknifing brake can be increased (i.e., the braking force on the wheels of the trailer can be increased).

The electrical signal generated by the electrical operating element can be an analog signal or a digital signal that can be varied infinitely or in multiple stages to represent a plurality of different values. In this way, the braking force exerted by the anti-jackknifing brake can be applied in infinite variations or multiple stages.

Advantageously, the braking force of the anti-jackknifing brake is generated by means of a spring-actuated brake cylinder of the trailer. Spring-actuated brake cylinders are commonly used in trailers. Thus, use can be made of existing components, without incurring extra cost associated with new or modified trailer parts.

According to a preferred embodiment of the present invention, the valve device for increasing the braking force of the anti-jackknifing brake is disposed or integrated in an electropneumatic modulator for a parking brake—which is implemented by means of at least one spring-actuated brake cylinder in the tractor and/or trailer. In this way, an anti-jackknifing brake function can be integrated into an existing parking-brake system with minimal additional complexity and at reduced cost.

According to another embodiment of the present invention, the valve device is a separate, independent device. Thus, the anti-jackknifing brake function can be implemented without relying on a parking-brake modulator, and, thus, independently of a parking-brake system.

According to a further embodiment of the present invention, the valve device for increasing the braking force of the anti-jackknifing brake is interposed in a trailer reservoir pressure line, which leads from at least one compressed-air reservoir tank of the tractor to a compressed-air reservoir tank of the trailer, so as to provide a compressed-air reservoir in the trailer. By this arrangement, the trailer reservoir pressure can be controlled. If the trailer reservoir pressure drops below a preselected value, the spring-actuated brake cylinders are actuated, such that the spring-actuated brake cylinders exert a braking force on the associated wheel brakes. Conversely, if the compressed-air reservoir in the compressed-air reservoir tank of the trailer is again raised by means of the valve device, the spring-actuated brake cylinders are repressurized, and, thus, the corresponding wheel brakes are released, unless the service brake is being simultaneously actuated.

According to a still further embodiment of the present invention, the braking force of the anti-jackknifing brake is generated by means of the service brake of the trailer. Advantageously, the valve device for increasing the braking force of the anti-jackknifing brake is then in communication with a control line, by means of which the brake pressure of the service brake of the trailer is controlled. This control line runs from a brake pedal of the service brake to at least one brake cylinder of the service brake in the trailer. Thus, by actuation of the electrical manual operating element, the brake pressure can be raised by injection of a pressure into the brake-pressure control line for the brakes of the trailer. In this embodiment, it is also possible to make use of existing components in the trailer, and no new or modified parts are necessary in the trailer in order to implement the anti-jackknifing brake function.

According to another advantageous embodiment of the present invention, the valve device for increasing the braking force of the anti-jackknifing brake can be controlled by a control device. This control device has an input for receiving a signal containing information about a locked condition of the wheels of the trailer. It is constructed such that it generates an electrical signal and sends it to the valve device. By means of the valve device, the braking force of the anti-jackknifing brake can be reduced as a function of the signal. In this way, anti-lock protection can be achieved for the anti-jackknifing brake. If a locking tendency of the wheels of the trailer develops, the braking force generated by the anti-jackknifing brake is reduced, so that the wheels tending to lock can turn freely again if necessary, or, because of smaller braking force, can turn at a speed corresponding to the vehicle's speed. This anti-lock protection can be provided both in the embodiment of the valve device in combination with the parking brake and in the embodiment in combination with the service brake.

If anti-lock protection is implemented in conjunction with the parking brake, the spring-actuated brake cylinder or cylinders of the trailer is/are pressurized, as a function of the electrical signal generated by the control device, when locking or a locking tendency of a wheel of the trailer is detected, so that the parking brake is released. Advantageously, the compressed-air reservoir tank of the trailer is pressurized as a function of this signal generated by the control device. In this way, the pressure in the spring-actuated brake cylinder(s) is raised and thus the braking force exerted by the parking brake is reduced.

According to yet a further embodiment of the present invention, the information signal about a potential locked condition of the wheels of the trailer is generated by an anti-lock system control unit in the trailer and transmitted via a suitable interface to the control device in the tractor. This information signal is either a simple signal, which globally displays locking of one or more wheels of the trailer or indicates activation of the anti-lock system of the trailer. Alternatively, this locked-condition information signal is a complex signal which provides greater information content about the locking tendency of each individual wheel of the trailer or each individual axle of the trailer.

According to still another embodiment of the present invention, the control device for control of the valve device for increasing the braking force of the anti-jackknifing brake is integrated into an anti-lock brake system control unit of the tractor. Alternatively, this control device is integrated in a separate control unit for the parking brake. In both cases, use of existing control units can be made so that no further control units have to be installed for the anti-jackknifing brake. Thus, additional installation expense can be avoided or minimized.

According to a further embodiment of the present invention, the electrical signal is a data bus message or the electrical signal can be transformed by the parking-brake modulator or by a control device associated with the parking brake modulator or by another electronic control unit into a data bus message. This data bus message can be evaluated by a brake-control module for control of the brake pressures for the brakes or brake cylinders of the tractor and/or trailer, so that an electrical anti-jackknifing brake control signal can be generated as a function of the evaluated signal and transmitted to the valve device constructed as the trailer control valve in order to influence the braking force of the anti-jackknifing brake. By means of the operating element, therefore, there can be generated, directly or indirectly, a digital data bus message which is evaluated by a brake-control module. After receipt of this message, the brake-control module modulates a pressure corresponding to the braking demand by the operator at the trailer control valve, preferably by sending a predetermined electrical or pneumatic signal to the trailer control valve. Advantageously, a CAN bus is used as the data bus, and the data bus message is a CAN data bus message, for example, as specified by SAE J1939.

The CAN data bus message can be generated either autonomously by the operating element or a control-element module housing the operating element, or by the parking-brake modulator, which receives an analog or digital electrical signal from the operating element. To this extent, at least the brake-control module and the operating element or the brake-control module and the parking-brake modulator are in communication via the CAN data bus, via which other vehicle components can also communicate with one another.

Advantageously, the brake-control module is an "EBS" control module, or, in other words, the control module of an electronic brake system, by which the brake pressures at the brakes of the tractor and/or trailer can be electronically controlled. This means that the brake pressures in the respective wheel brake cylinders can be electronically modulated. Such modulation of the brake pressures can be applied either to each wheel or to each axle.

According to another embodiment of the present invention, the brake-control module is the control module of an anti-lock brake system, automatic traction control valves for automatic traction control being associated with the brakes, especially the brake cylinders of the brakes, in such a system.

Preferably, the electrical signal generated by the operating element represents a braking-deceleration value or a brake-pressure value. Thus, a definite braking deceleration can be imposed. That is, the operator specifies the negative acceleration with which the vehicle will be braked. Alternatively, the electrical signal of the operating element can be interpreted as the brake-pressure value, so that a brake pressure corresponding to the position of the operating element is modulated at the brakes, especially the brake cylinders. In the first case, the acceleration or deceleration of the vehicle is also advantageously measured and fed to a brake-control circuit. In the second case, one or more brake-pressure sensors are provided to feed the brake-pressure values to the brake-control circuit and adjust the desired brake pressure.

Advantageously, the generated data bus message is linked with further messages which are generated by a brake power generator, for example, and is respectively weighted and processed in the brake control module. This makes it possible to set priorities for different messages. Linking takes place according to a linking mode that determines which message contents are most important to defining the braking request. For example, a braking request may be generated both by the anti-jackknifing brake operating element and the service-brake pedal. The linking mode then determines whether the two requests will be added or, for example, whether the higher of the two values will be selected.

Furthermore, by means of the brake-control module, it is possible to generate status messages, which represent implementation or non-implementation of the operator's braking demand indicated by means of the operating element. A status message can be signaled by means of a signal generator, especially of optical or acoustical type, in the operator's cab. In this way, the vehicle operator receives feedback as to whether his/her braking demand has been successfully implemented in the anti-jackknifing brake.

The operating element can be advantageously constructed as a multi-position lever, as a slide, especially a slide rheostat, or as a rotary knob, especially a rotary rheostat. Preferably, the operating element has an integrated electronic module, with which the CAN data bus message can be generated from the position of the operating element. In this way, there is provided an anti-jackknifing brake operating module, with which a variable braking signal can be generated for the trailer, which merely has to be connected to a CAN data bus already present in the vehicle. The installation complexity for implementation of an anti-jackknifing brake is therefore minimal.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

As used herein, the term "trailer" is to be understood as any mobile unit that can be towed by a tractor; in particular, the term "trailer" includes vehicles resting on a plurality of axles, as well as vehicles constructed on only one axle or on one double axle and supported at one of their ends on the tractor (such vehicles are also known as "semitrailers").

Figure 1:
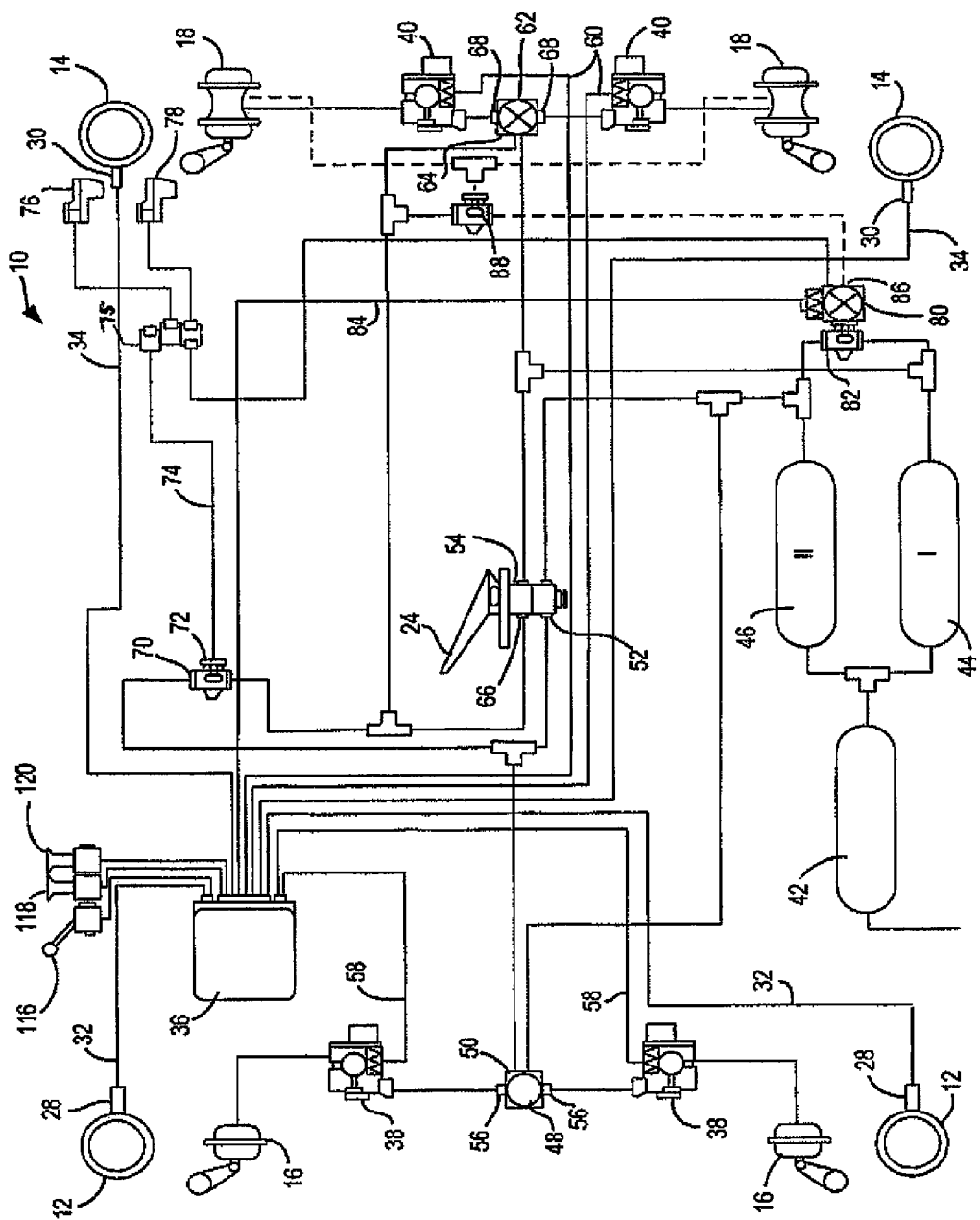
FIG. 1 is a simplified schematic diagram of an air-brake system with an anti-jackknifing brake and an electropneumatic modulator for control of a parking brake according to one embodiment of the present invention.
Figure 2:
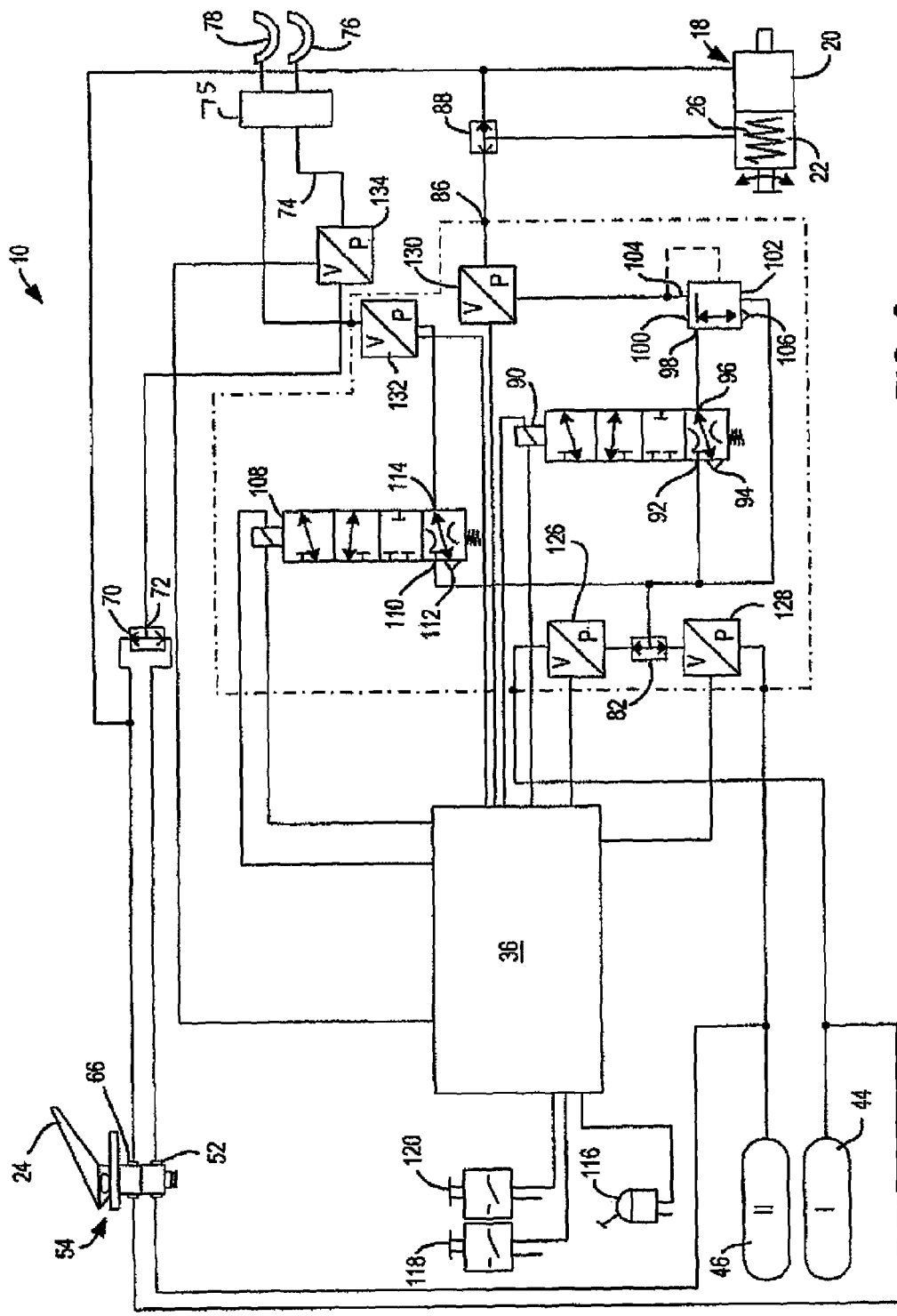
FIG. 2 is a more detailed schematic diagram of a portion of the air-brake system depicted in FIG. 1.

Referring now to the drawing figures where like reference numerals are used for corresponding parts, FIGS. 1 and 2 depict an air-brake system 10 for a vehicle, such as, for example, a commercial vehicle (e.g., truck or bus), that can be operated with a trailer. In FIG. 1, two wheels 12 of a front axle and two wheels 14 of a rear axle are shown. Wheels 12 of the front axle are braked via brake cylinders 16, and wheels 14 of the rear axle are braked via brake cylinders 18.

It should be understood that, even if only four wheels on two axles are represented, the present invention is not limited to such a number of wheels or number of axles. Indeed, the present invention also has application with respect to vehicles with more than four wheels or more than two axles.

Brake cylinders 18 of the rear axle are constructed as combination spring-actuated/diaphragm cylinders. In FIG. 2, only one such brake cylinder 18 is shown, for reasons of simplified illustration; it should be understood that a plurality of such brake cylinders 18 is present. These spring-actuated/diaphragm cylinders are provided with a diaphragm part 20 as well as a spring-actuated part 22. Diaphragm part 20 is used to provide a service brake, which is actuated pneumatically via a brake pedal 24. Spring-actuated part 22 is used to provide a locking brake (also known as a parking brake). This spring-actuated part 22 is provided with an actuator spring 26, which engages the wheel brake of the corresponding wheel when spring-actuated part 22 is vented. The vehicle is then braked or immobilized. By admission of compressed air, this spring-actuated part 22 can compress actuator spring 26 and thus release the parking brake. Spring-actuated part 22 can be constructed largely independently of (and, in principle, separately from) diaphragm part 20 of the service brake. Nevertheless, combination spring-actuated/diaphragm cylinders, in which both the service brake and the parking brake are implemented, are preferred. Accordingly, hereinafter, the term "spring-actuated brake cylinder" should be understood to include such combination spring-actuated/diaphragm cylinders.

Wheels 12, 14 are equipped with wheel-speed sensors 28, 30. Sensors 28, 30 are connected via electrical lines 32, 34 to a control unit 36.

Wheel-speed sensors 28, 30, respectively, measure the speed of associated wheels 12, 14 in order to detect whether the respective wheel 12, 14 is locked or tending to lock. Control unit 36 evaluates the measured wheel speeds and, if necessary, reduces the brake pressure acting on brake cylinders 16, 18 by means of valve devices 38, 40.

A compressed-air supply device 42 supplies two compressed-air reservoir tanks 44, 46 with compressed air. The first compressed-air reservoir tank 44 is used to provide compressed air for the brakes of the rear axle. The second compressed-air reservoir tank 46 is used to provide compressed air for the brakes of the front axle. The pressure of compressed-air reservoir tank 46 for the brakes of the front axle is routed to an airflow-boosting valve device constructed as a relay valve 48. This relay valve 48 also has a control input 50 which is supplied with a modulated pressure 52 for brake cylinder 16 of the front axle. Pressure 52 is made available by brake-actuating device 54 in communication with brake pedal 24.

Relay valve 48 has a dual output 56, which is in communication with valve devices 38 of each brake cylinder 16 of the front axle. Valve devices 38 as well as valve devices 40 of the rear axle are connected via electrical lines 58, 60 to control unit 36.

Via compressed-air lines, pressure reservoir tank 44 is in communication with a further airflow-boosting valve device constructed as relay valve 62. This relay valve has a control input 64, to which a modulated pressure 66 for brake cylinders 18 of the rear axle is admitted via compressed-air lines. This pressure 66 is provided by brake-actuating device 54.

Relay valve 62 also has a dual output 68, which is in communication with valve devices 40 for brake cylinders 18 of the rear axle.

By actuation of brake pedal 24, a modulated pressure 52 or 66 is provided for the front axle or rear axle, respectively. The airflow provided at the respective pressure is boosted by means of relay valves 48 and 62, respectively. After airflow boosting, the corresponding pressure is then relayed via valve devices 38, 40 to brake cylinders 16, 18, unless these valve devices 38, 40 reduce this pressure, for example because control unit 36 has detected locking or a locking tendency of one or more wheels. In this way, control unit 36 in combination with wheel-speed sensors 28, 30 provides an anti-lock system.

Modulated pressures 52, 66 for the front axle and rear axle, respectively, are further fed to a select-high valve 70, which selects the higher of the two modulated pressures 52, 66 and provides it at its output 72. This pressure is fed as a service-brake pressure via a control line 74 through trailer control valve 75 to a compressed-air coupling 76, at which there can be connected a corresponding compressed-air line of a trailer coupled to the tractor. It should be appreciated that trailer control valve 75 therefore functions as a pneumatic interface between the tractor vehicle and the trailer.

Via a further compressed-air coupling 78, compressed air for a compressed-air reservoir tank in the trailer is also made available. Via a compressed-air line, this compressed-air coupling 78 is in communication with an electropneumatic modulator 80 for the parking brake of the tractor or also of the trailer.

Modulator 80 has a double check valve 82, via which modulator 80 is in communication with compressed-air reservoir tanks 44, 46. Modulator 80 is therefore supplied with the higher of the two reservoir pressures of compressed-air reservoir tanks 44, 46. Simultaneously, this double check valve 82 ensures that the pressure in modulator 80 will not drop suddenly in the event of a pressure drop in one or both compressed-air reservoir tanks 44, 46.

As a function of a signal fed via electrical lines 84 from control unit 36, modulator 80 generates, at modulator output 86, a modulated pressure that is fed via an interposed overload-protection valve or select-high valve 88 to each spring-actuated part 22 of combination spring-actuated/diaphragm cylinder 18 of the rear axle. This overload-protection valve 88 is connected between spring-actuated part 22, output 86 and brake-actuating device 54. Overload-protection valve 88 selects the higher of the two pressures present at its inputs leading to brake-actuating device 54 or to output 86 of modulator 80 and passes it via its output to spring-actuated part 22 of brake cylinder 18. Overload-protection valve 88 prevents addition of the braking force exerted by the service brake and the braking force exerted by the parking brake or actuator spring 26, in this way preventing mechanical overloading of the brake mechanism in the wheel brake associated with brake cylinder 18.

For simplicity, diaphragm part 20 is shown directly connected to brake-actuating device 54 in FIG. 2. Also for reasons of simplicity, relay valve 62 (see FIG. 1) is not shown in FIG. 2.

It should be understood that relay valves 48 and 62 are optional. If brake-actuating device 54 makes modulated pressures available with an adequate airflow, there is no need to employ these relay valves.

The structure of modulator 80 will now be explained in greater detail on the basis of FIG. 2. Modulator 80 is provided with a first valve device 90, which is an electrically actuatable solenoid valve. This valve device 90 has three ports. A first port 92 is in communication with double check valve 82 (depicted as integrated in the modulator) and, thus, with the higher of the two reservoir pressures of compressed-air reservoir tanks 44, 46. Valve device 90 also has a second port 94 which is used for venting. Additionally, valve device 90 has a third port 96 which is in communication with control input 98 of a relay valve 100 serving as an airflow-boosting valve device. This relay valve has three further ports: one inlet 102 of relay valve 100 is also in communication, via double check valve 82, with the higher of the two reservoir pressures of compressed-air reservoir tanks 44, 46. One outlet 104 of relay valve 100 is in communication with output 86 of modulator 80.

At its outlet 104, relay valve 100 delivers a pressure present at its control input 98, but with a higher airflow, to the extent that such is required. Via a venting outlet 106, relay valve 100 can react rapidly to dissipate the pressure at outlet 104 if the control pressure at control input 98 drops.

Via control unit 36, the pressure at output 86 of modulator 80 can be controlled by means of valve device 90 and relay valve 100. In this way, the pressure in spring-actuated part 22 of combination spring-actuated/diaphragm cylinder 18 can also be controlled. If the pressure in spring-actuated part 22 is high, actuator spring 26 is compressed and the parking brake is released. In contrast, if the pressure in spring actuator part 22 is low, meaning that spring-actuated part 22 is vented, the actuator spring expands and the parking brake is engaged.

Valve device 90 has a plurality of states. When it is de-energized, it occupies a first state, in which throttled venting of spring-actuated part 22 takes place.

Valve device 90 occupies a second, energized state in which the pressure is held at control input 98 and therefore in spring-actuated part 22, since control input 98 in this second state is isolated from first port 92 of valve device 90.

Valve device 90 occupies a third, energized state in which first port 92 is in communication with third port 96, meaning that the higher of the two reservoir pressures is being passed through to control input 98 of relay valve 100. Thus, the pressure in spring-actuated part 22 also rises, in turn compressing the actuator spring and thus releasing the parking brake.

In a fourth state, which is also energized, sudden venting of control input 98 via the second port of valve device 90 occurs. Thus, the pressure at outlet 104 of relay valve 90 also drops suddenly. This in turn leads to a rapid drop of the pressure in spring-actuated part 22 and, thus, to rapid engagement of the parking brake.

In this way, there is provided a parking brake that can be electrically controlled by means of control unit 36.

Modulator 80 is also provided with a further valve device 108 which is structured just as valve device 90 with a plurality of states and a plurality of ports. A first port 110 of valve device 108 is in communication with the higher of the two reservoir pressures of compressed-air reservoir tanks 44, 46. A second port 112 of valve device 108 forms a vent. A third port 114 of valve device 108 is in communication with compressed-air coupling 78 through trailer control valve 75.

Valve device 108 is also connected electrically to control unit 36. Preferably, it is constructed to be the same as valve device 90, in which case the foregoing description of the different states is applicable by reference. However, since port 114 of valve device 108 is in communication with coupling 78 for the reservoir pressure in the trailer, the reservoir pressure in the trailer can be raised, lowered or maintained by means of valve device 108. Since the reservoir pressure in the trailer also influences the parking brake of the trailer, the parking brake of the trailer can be actuated, or in other words engaged or released, via control of the reservoir pressure in the trailer. Thus, if the reservoir pressure in the trailer drops below a preselected limit value, the spring actuators of the combination spring-actuated/diaphragm cylinders that are also provided in the trailer are activated and the parking brake of the trailer is engaged. However, if the reservoir pressure has exceeded a certain threshold value, the parking brake is released. Braking of the trailer can then take place by means of the service brake.

Valve device 108 and, thus, the reservoir pressure in the trailer is controlled via control unit 36. Control unit 36 is also connected via electrical lines to a manual operating element 116. This operating element is constructed as an analog or digital signal generator, for example. Depending on the electrical signal generated by operating element 116, control unit 36 generates an electrical control signal for valve device 108, in this way, controlling the pressure in the compressed-air reservoir tank of the trailer.

Control unit 36 is also connected to two further electrical operating elements 118, 120 which, in common with operating element 116, are disposed in the operator's cab. Operating elements 118 and 120 are used for actuation of the parking brake of the tractor or of the trailer. The parking brake of the tractor or the parking brake of the trailer is actuated, or, in other words, engaged or released, by actuation of operating element 118 or by actuation of operating element 120, respectively.

Valve device 90 and/or valve device 108 can be constructed as 3/4-way solenoid valves, as illustrated in FIG. 2, in which case they are solenoid valves with three pneumatic ports and four states. Alternatively, however, they can also be constructed as double-armature solenoid valves. As a further alternative, the corresponding valve device 90 or 108 can be constructed as a combination of one 3/2-way solenoid valve and one 2/2-way solenoid valve constructed as a holding valve.

Figure 3:
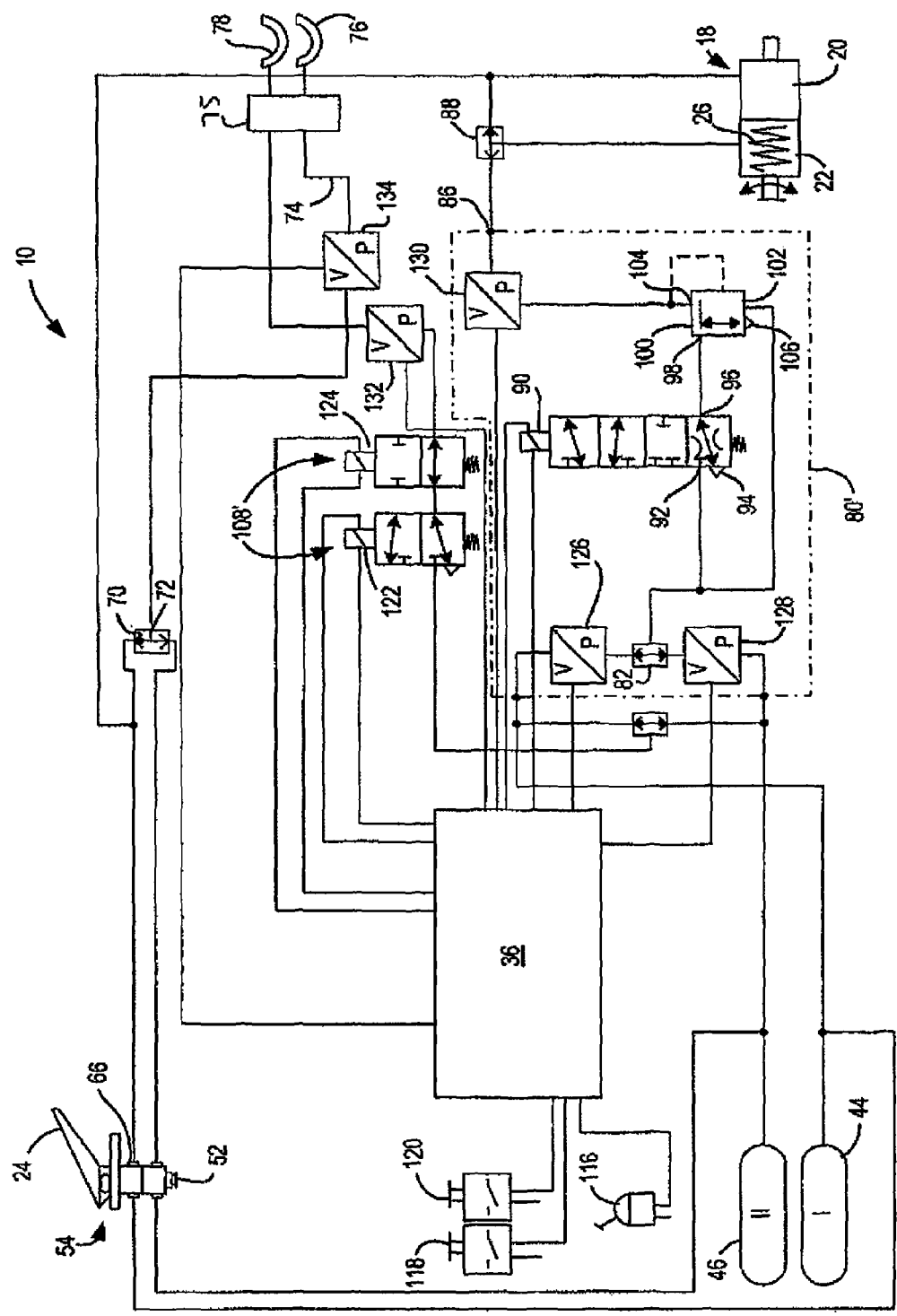
FIG. 3 is a schematic diagram of an alternative construction of the embodiment of the air-brake system depicted in FIG. 2.

As an example, FIG. 3 shows a construction of valve device 108' as a 3/2-way solenoid valve 122 as well as a 2/2-way solenoid valve 124. In other respects, FIG. 3 corresponds to the embodiment depicted in FIG. 2, although valve device 108 shown therein is disposed outside modulator 80', so that only the parking-brake function of the tractor, and not the parking and anti-jackknifing brake function of the trailer, is implemented in modulator 80'. Indeed, it is advantageous to include valve device 108' also in the modulator; however, this is not necessary. Alternatively, therefore, valve device 108' can be provided separately. Also, in this separate arrangement, valve device 108' can be configured as a 3/4-way solenoid valve, as a double-armature solenoid valve or as a combination of a 3/2-way solenoid valve with a 2/2-way solenoid valve.

As depicted in FIGS. 2 and 3, diverse pressures can be measured by means of pressure sensors 126, 128, 130, 132 and 134. Pressure sensor 126 measures the pressure in compressed-air reservoir tank 44. The pressure in compressed-air reservoir tank 46 is measured by means of pressure sensor 128. Pressure sensor 130 measures the pressure at output 86 of modulator 80, 80' or at outlet 104 of relay valve 100. Pressure sensor 132 measures the pressure at the third port of valve device 108, 108' or at compressed-air coupling 78, and, thus, it measures the reservoir pressure of a coupled trailer. The control pressure of the service brake for the trailer is measured by means of pressure sensor 134. All measured pressures are evaluated in control unit 36 in order that particular conditions can be recognized if necessary and that commensurate measures for control of the solenoid valves can be initiated if necessary.

Indeed, measurements of all cited pressures are advantageous. However, it is not necessary to measure all cited pressures in every embodiment of the present invention. One or more of the cited pressure measurements may be omitted in alternative embodiments. In particular, pressure sensor 134 and, thus, measurement of the control pressure of the service brake of the trailer can be omitted in the embodiments of the present invention depicted in FIGS. 2 and 3. Furthermore, depending on embodiment, all or only some of the cited pressure sensors may be disposed inside or outside the modulator.

Figure 4:
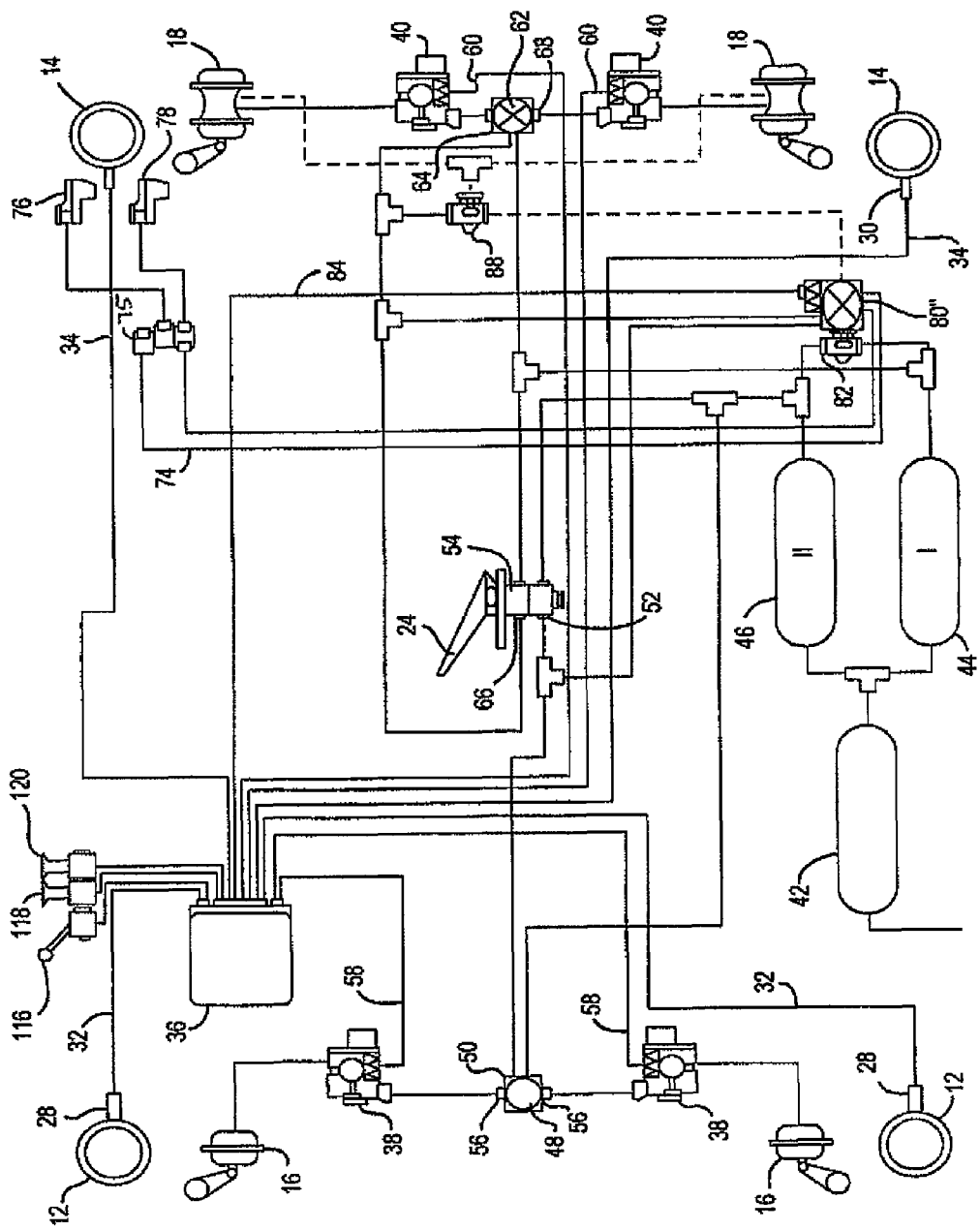
FIG. 4 is a simplified schematic diagram of an air-brake system with an anti-jackknifing brake and an electropneumatic modulator for control of a parking brake according to another embodiment of the present invention.
Figure 5:
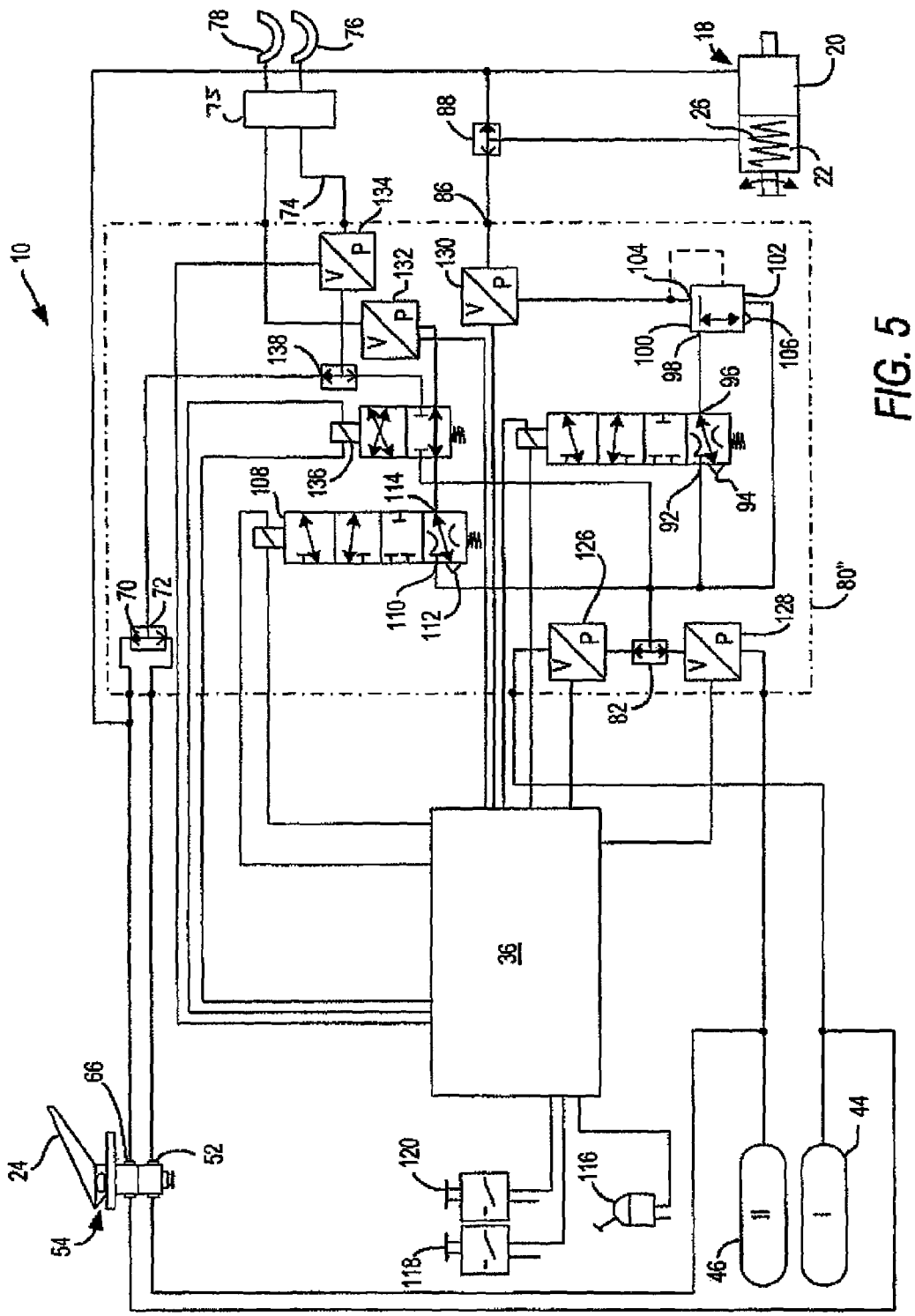
FIG. 5 is a more detailed schematic diagram of a portion of the air-brake system depicted in FIG. 4.

FIGS. 4 and 5 show a further embodiment of the present invention that broadly corresponds to the embodiment shown in FIGS. 1 and 2. To this extent, the foregoing discussion is applicable by reference, unless otherwise indicated hereinafter. In particular, like reference symbols denote like parts.

A substantial difference with respect to the embodiment shown in FIGS. 4 and 5 lies in the configuration of electropneumatic modulator 80" for the parking brake. As shown in FIG. 5, this now encompasses select-high valve 70 as well as pressure sensor 134, among other components.

Both modulated pressure 52 for the front axle and modulated pressure 66 for the rear axle are fed to modulator 80". Furthermore, modulator 80" has a pneumatic connection to compressed-air coupling 76 for the control pressure of the service brake of the trailer.

Figure 6:
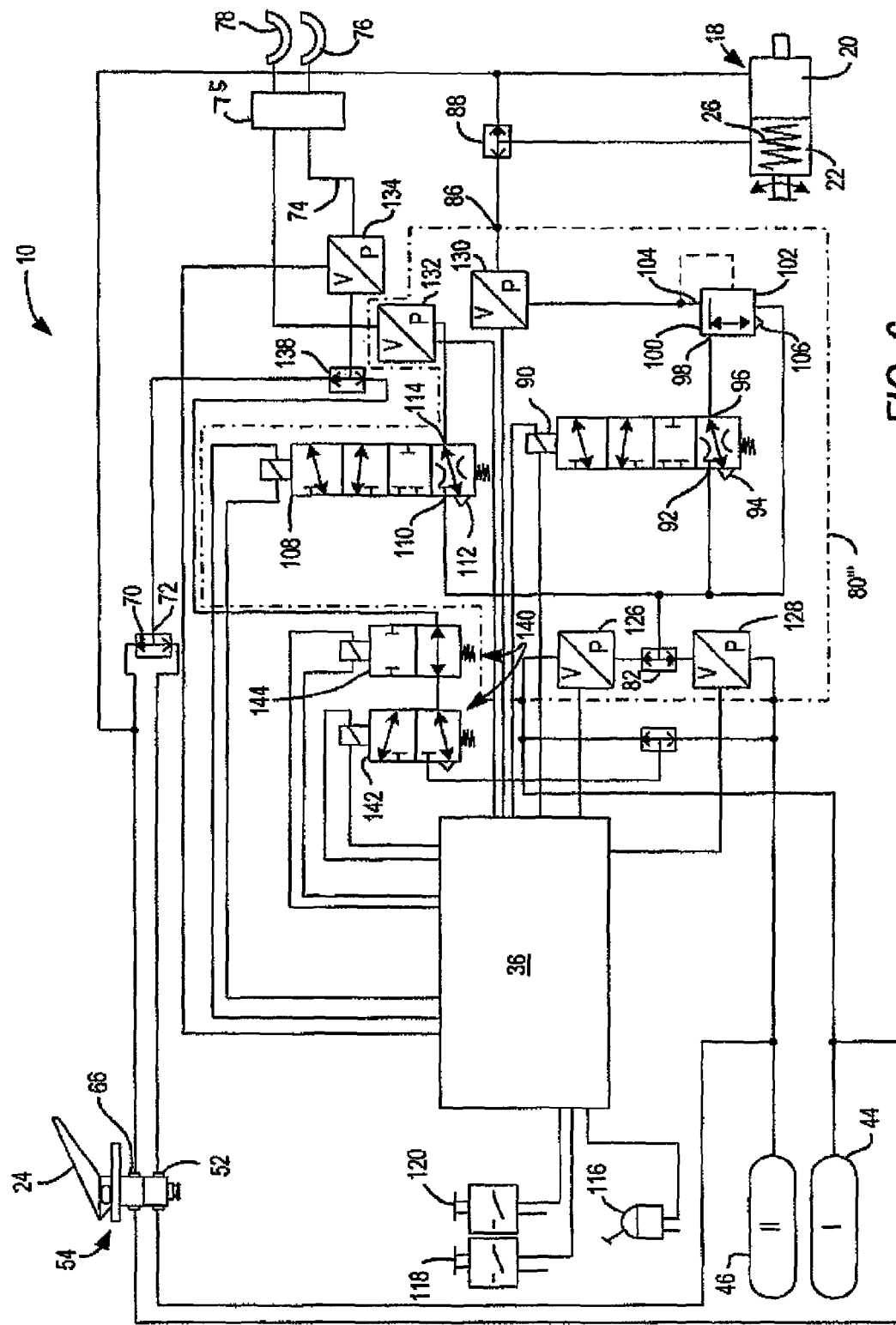
FIG. 6 is a schematic diagram of an alternative construction of the embodiment of the air-brake system depicted in FIG. 5.

In contrast to the embodiments depicted in FIGS. 1, 2 and 3, in which the spring-actuated parts of the combination spring-actuated/diaphragm cylinders of the trailer are used to implement the anti-jackknifing brake function, in the embodiment depicted in FIGS. 4 and 5 and also in FIG. 6, the service brake is used to implement the anti-jackknifing brake function. The advantage of using the service brake lies in the fact that automatic anti-lock protection already exists by virtue of the anti-lock system that is usually already present in the trailer, plus the fact that higher braking forces can be transmitted by the service brake. Furthermore, the response times of the service brake are sometimes much shorter than when the spring-actuated parts of the combination spring-actuated/diaphragm cylinders are used.

By analogy to the embodiment of the present invention depicted in FIG. 2, the embodiment depicted in FIGS. 4 and 5 also uses valve device 108, which is already available, in order to pressurize or vent via compressed-air coupling 78 as well as an associated reservoir line, in order to pressurize or vent the compressed-air reservoir tank in the trailer and, via the pressure in this compressed-air reservoir tank, indirectly the spring-actuated parts of the combination spring-actuated/ brake cylinders of the trailer. However, changeover valve 136 is additionally connected downstream from valve device 108. Upon actuation of the anti-jackknifing brake by means of operating element 116, changeover valve 136 is energized and thus actuated. In this way, the spring actuators of the trailer remain pressurized, since changeover valve 136 conveys the higher of the two reservoir pressures of compressed-air reservoir tanks 44, 46 directly through to compressed-air coupling 78 for the reservoir pressure of the trailer. The braking force exerted by the respective spring-actuated part of the combination spring-actuated/brake cylinders of the trailer is thereby minimized or reduced to zero.

At the same time, control line 74, which is in communication with compressed-air coupling 76 for the control pressure, is placed in communication with valve device 108, so that the pressure in the service brake of the trailer can be modulated. In this way, the service brake pressure in the trailer can be changed electropneumatically via control unit 36 and manual operating element 116.

As an example, changeover valve 136 is constructed as a 4/2-way solenoid valve with four pneumatic ports and two states. In a first, de-energized state, the trailer reservoir pressure line can be controlled by means of valve device 108 with respect to the pressure conveyed to coupling 78 for the reservoir pressure in the trailer, while control line 74 for control of the brake pressure of the service brake for the trailer cannot be influenced by modulator 80". In a second, energized state of changeover valve 136, however, the trailer reservoir pressure line is pneumatically in communication with the reservoir pressure of the tractor, and control line 74 for control of the service brake pressure in the trailer is pressurized with compressed air or vented as necessary by means of valve device 108.

The trailer can also be braked with foot brake pedal 24. For this purpose, there is interposed in control line 74 a select-high valve 138, which is in communication with changeover valve 136. This select-high valve 138 relays the higher of the two pressures present at its inputs to compressed-air coupling 76 for the control pressure of the service brake of the trailer. The higher of the two modulated pressures 52, 66 is present at its first input, and the modulated pressure of the third port 114 of valve device 108 is present at its second input, when changeover valve 136 is energized.

The pressure in control line 74 can be adjusted by means of pressure sensor 134. Alternatively, the pressure in control line 74 is adjusted on the basis of the measured braking deceleration, taking into consideration the position of operating element 116 and, if applicable, the actuation of brake pedal 24. In this alternative scheme, pressure sensor 134 can be omitted.

As explained above in connection with FIG. 2, valve device 108 can be constructed as a 3/4-way solenoid valve with four states. In this way, the pressure in the control line not only can be raised and lowered but also held. In an alternative embodiment, a simpler 3/2-way solenoid valve can be used instead of this valve, although it has no pressure-holding position but only two positions for raising or lowering the pressure. Pressure holding can be achieved by operating this valve in pulsed mode.

In addition to a 3/2-way solenoid valve, however, there can also be provided a holding valve, for example in the form of a 2/2-way solenoid valve, so that the pressure in control line 74 can also be held. Pulsed operation of the 3/2 solenoid valve is then obviated, thus avoiding unnecessary air consumption.

FIG. 6 depicts a further embodiment of the present invention. In contrast to the embodiment depicted in FIG. 2 or FIG. 3, according to the embodiment of FIG. 6 the anti-jackknifing brake function can be used both via the spring-actuated part of the combination spring-actuated/brake cylinders of the trailer and via the service brake of the trailer. To this extent, valve 108 is provided in order to raise, lower or hold the reservoir pressure in the trailer.

The pressure in control line 74 can also be raised via a further valve device 140 in order to actuate the service brake in the trailer. Similarly, as in the embodiment depicted in FIG. 4, a select-high valve 138 is interposed in control line 74 for this purpose. Once again, one input of this select-high valve 138 is in communication with select-high valve 70 for selection of the higher of the two modulated pressures 52, 66. The second input of select-high valve 138 is in communication with valve device 140, which, in turn, is in communication with the higher of the two reservoir pressures of compressed-air reservoir tanks 44, 46. By means of valve device 140, the pressure in control line 74 can be raised in order to actuate the service brake of the trailer. Valve device 140 is actuated via control unit 36, which, in turn, can be controlled by operating element 116.

Preferably, valve device 140 is constructed as a combination of a 3/2-way solenoid valve 142 and a 2/2-way solenoid valve or holding valve 144. Also, valve device 140 is preferably disposed outside modulator 80''', or, in other words separately. However, it can also be integrated in modulator 80'''.

Figure 7:
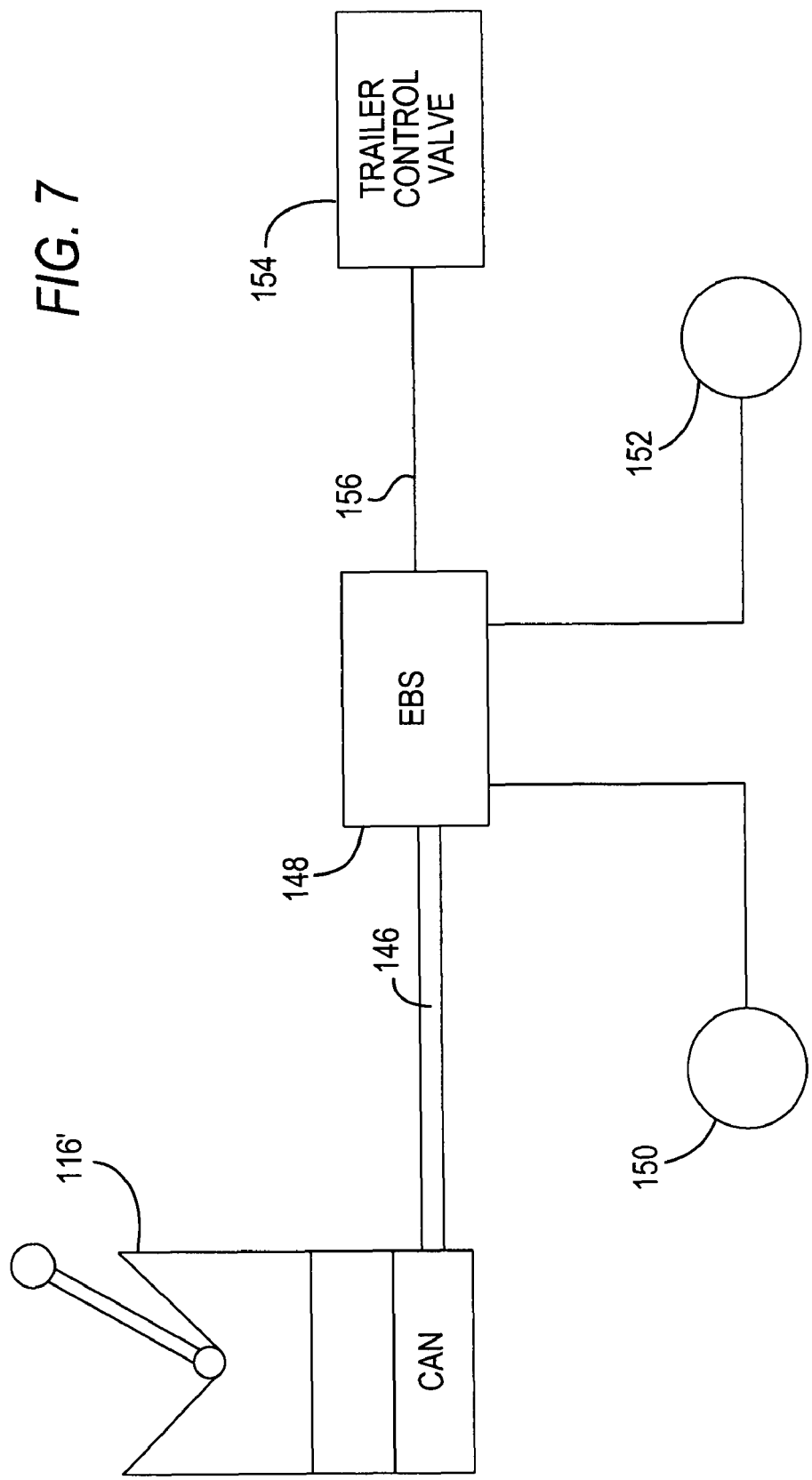
FIG. 7 is a schematic diagram of a CAN-bus-compatible operating element for control of the anti-jackknifing brake function according to a further embodiment of the present invention.
Figure 8:
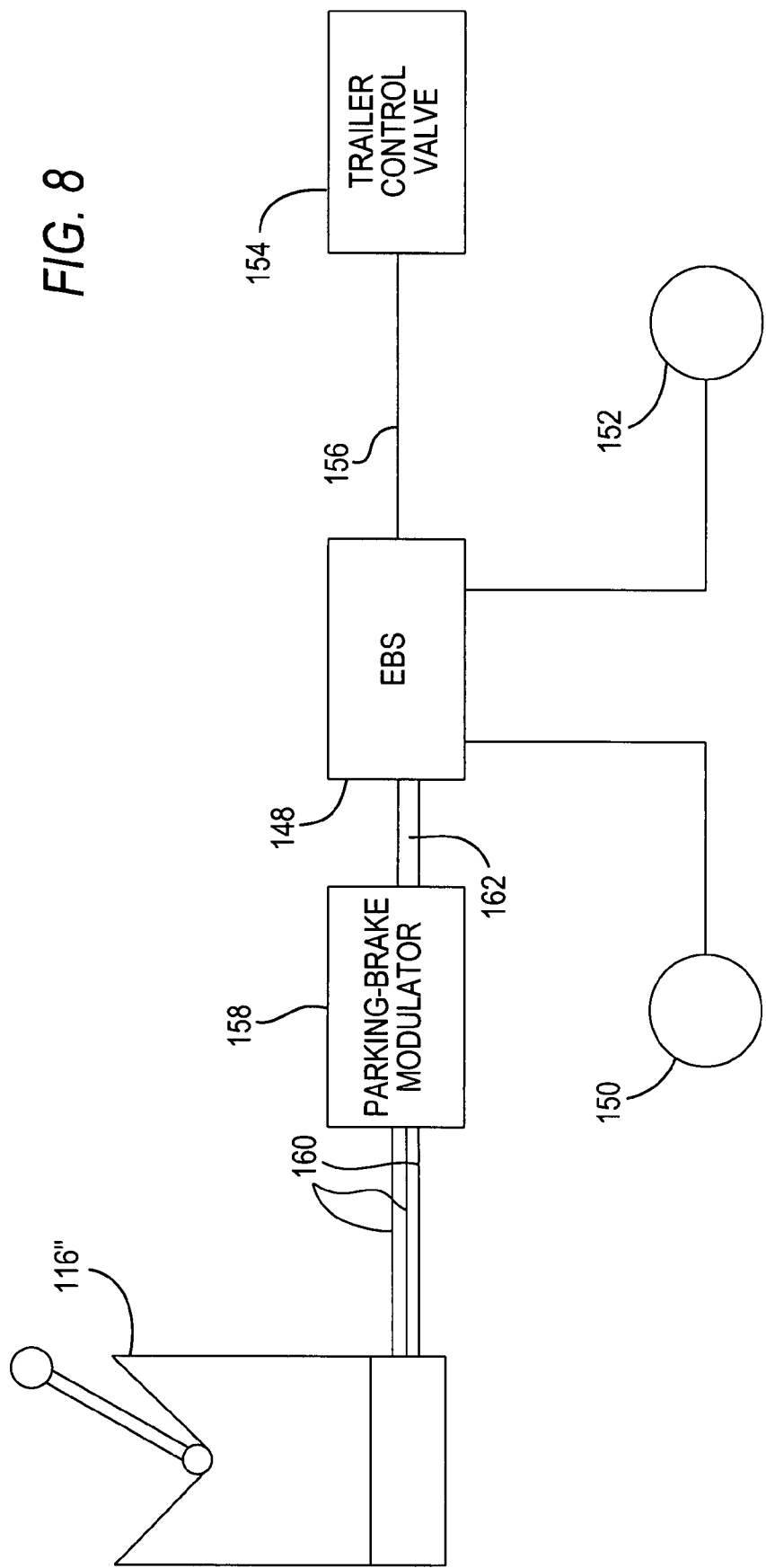
FIG. 8 is a schematic diagram of an operating element connected to a parking-brake module with an analog output signal for control of the anti-jackknifing brake function according to another embodiment of the present invention.

FIGS. 7 and 8 show operating elements for control of the anti-jackknifing brake function in brake systems linked by a CAN data bus.

FIG. 7 shows operating element 116', which, via a CAN data bus 146, can send a digital signal to an EBS control unit 148 to control an electronic brake system. The CAN data bus message of operating element 116' represents one position of operating element 116', which, in turn, represents a braking demand of the vehicle operator for the anti-jackknifing brake. EBS control module 148 sends electrical signals not only to the electropneumatic axle modulators of front axle 150 and of rear axle 152 of the tractor for control of the respective brake pressures at these axles, but also to a trailer control valve 154. Trailer control valve 154 is therefore connected to the EBS control module via electrical lines 156. Trailer control valve 154 outputs a modulated pressure for the brakes of the trailer at a compressed-air port of a brake control line. In this way, actuation of operating element 116' can be controlled or adjusted to a modulated pressure in the brake control line from the trailer control valve to the trailer brakes.

In the embodiment of the present invention depicted in FIG. 7, operating element 116' already has an electronic module with which it can generate a CAN data bus signal from a position of the operating element. Indeed, such an electronic module directly on operating element 116' is advantageous. However, it should be understood that the CAN data bus signal can also be generated at other locations.

FIG. 8 depicts an alternative embodiment of the present invention in which the CAN data bus signal is generated at another location, for example by a parking-brake modulator 158. In this practical example, operating element 116" generates an analog signal which is conducted via electrical lines 160 to parking-brake modulator 158. In this embodiment, parking-brake modulator 158 has an electronic module in order to generate a CAN data bus signal from the analog signals obtained from operating element 116" via electrical lines 160. Once again, this CAN data bus signal represents a position of operating element 116" and, therefore, a braking demand of the vehicle operator. The CAN data bus signal is sent from parking-brake modulator 158 via a CAN bus 162 to EBS control module 148, which in turn, just as EBS control module 148 shown in FIG. 7, provides electrical signals for the brake pressures at front axle 150 and rear axle 152 as well as via electrical lines 156 to trailer control valve 154.

According to a further embodiment of the present invention, the operating element generates not an analog signal but instead a digital signal, although not a signal that is compatible with the CAN data bus. This digital signal is, in turn, provided to parking-brake modulator 158, which generates a CAN data bus signal from the digital signal. Otherwise, this embodiment operates in the same way as the embodiment depicted in FIG. 8.

FIGS. 7 and 8 differ only in regard to the provision of the data bus signal, which, in the embodiment shown in FIG. 7, is generated directly by operating element 116', whereas, in the embodiment shown in FIG. 8, it is generated only indirectly by operating element 116", namely by interposed parking-brake modulator 158 or by another electronic control unit, such as, for example, a vehicle guidance computer.

Figure 9:
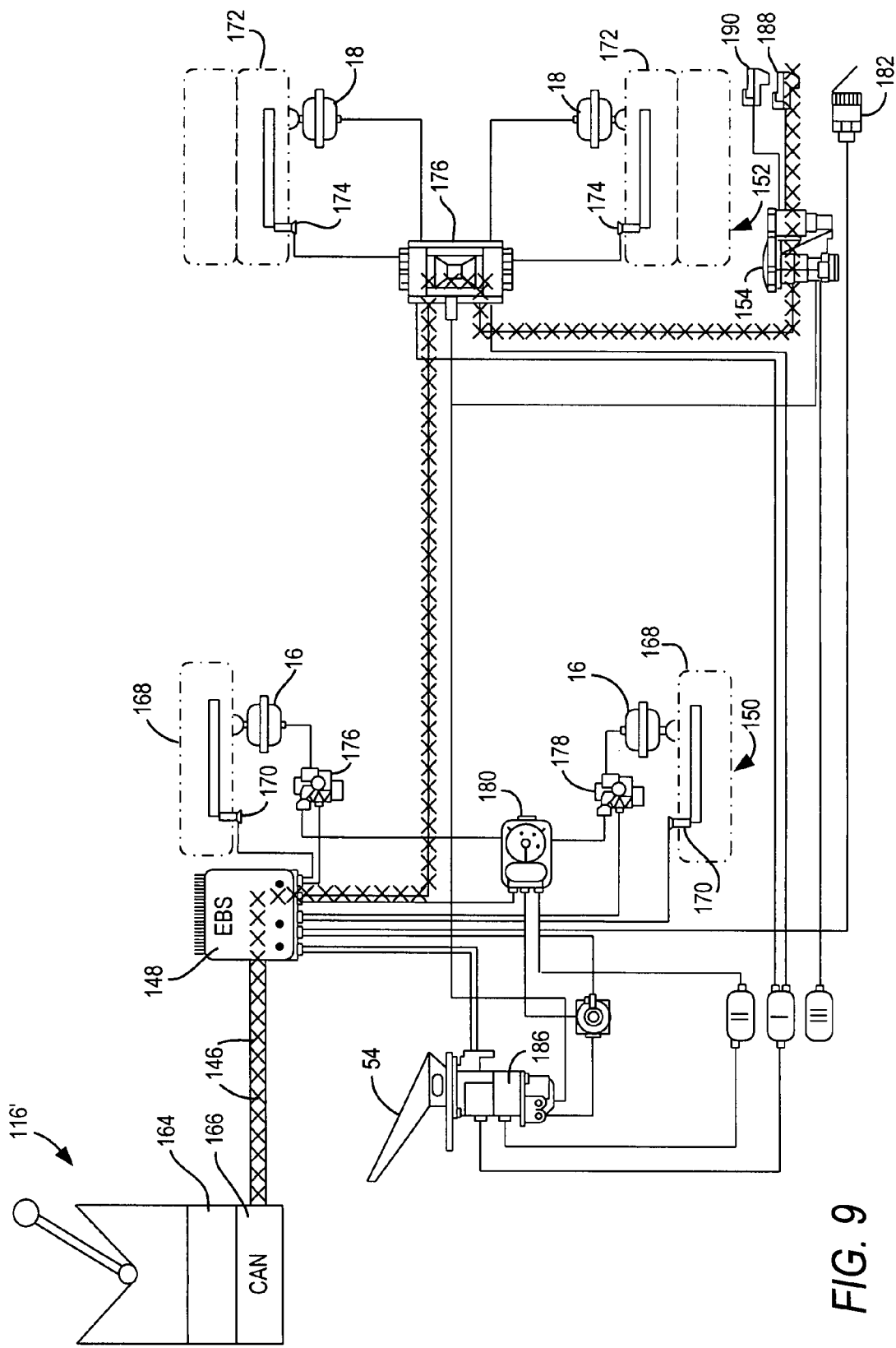
FIG. 9 is a more detailed view of the construction depicted in FIG. 7.

FIG. 9 is a more detailed view of the embodiment of the present invention depicted in FIG. 7. In this case, operating element 116' is constructed as an operating lever. On operating element 116' there is provided a displacement/voltage converter 164 which converts a position of the operating lever or a value traveled by the operating lever into an electrical voltage. This displacement/voltage converter 164 is connected to an electronic module 166 which converts the electrical signal output by the displacement/voltage converter into a CAN bus message. Among other features, this bus message has a digital value equal to 8 or 16 bits in length. Thus, $2^8$ or $2^{16}$ different positions of operating element 116' can be coded and a variable brake signal can be generated.

CAN bus module 166 is advantageously integrated in operating element 116'. However—as in the embodiment depicted in FIG. 8—it can also be disposed separately in another unit, especially, an electronic control unit.

CAN bus module 166 is connected via CAN data bus 146 to EBS control module 148.

EBS control module 148 is also connected to wheel sensors 170 mounted in the region of wheels 168 of front axle 150 as well as to wheel sensors 174 mounted in the region of wheels 172 of rear axle 152. Furthermore, EBS control module 148 is connected to rear-axle brake modulator 176 and, via this rear-axle brake modulator 176, to trailer control valve 154. Also, EBS control module 148 is connected to a brake power generator of brake-actuating device 54 and to ABS valves 178. EBS control module 148 is further connected to a relay valve 180 for control of the brake pressures at front axle 150, and to an electrical connecting device, such as a plug 182, functioning as an interface, by means of which the control unit can exchange electrical signals, especially data, with the trailer.

All cited connections of EBS control module 148 are electrical connections established by means of electrical lines.

In normal operation, actuation of brake-actuating device 54 causes the brake power generator associated therewith to send an electrical signal to EBS control module 148. EBS control module 148, taking other vehicle conditions into consideration, such as, for example, the values of wheel sensors 170, 174, calculates electrical signals for relay valve 180 and rear-axle brake modulator 176, so that relay valve 180 and rear axle brake modulator 176 can modulate appropriate brake pressures as a function of the electrical signals fed to them.

This electronic brake system also takes over the function of an anti-lock system. If one or more of wheel sensors 170, 174 signals a wheel speed, especially a lower speed, that does not correspond to the vehicle speed, the brake pressure can be reduced by means of ABS valves 178 and corresponding valves (not shown in FIG. 9) so that wheels that may be locked or exhibiting a tendency to lock are acted on with a lower brake pressure and, thus, can regain the speed of revolution corresponding to the vehicle speed.

The electrical signal generated by operating element 116' passes first via CAN data bus 146 to EBS control module 148 and is then conducted as an electrical control signal via rear-axle brake modulator 176 to trailer control valve 154 and, from there, via a compressed-air port 188 to the brake control line leading to the trailer brakes. Besides this compressed-air port 188 for the brake control line, trailer control valve 154 is in communication with a further compressed-air port, namely, compressed-air supply port 190 for the trailer.

The described signal path from operating element 116' to the compressed-air port of brake-control line 188 is illustrated by hatching in FIG. 9.

Although operating element 116' is illustrated as an anti-jackknifing brake lever module in FIG. 9, other electrical signal generators can be used in alternative embodiments of the present invention. It should be understood that the present invention is not limited to a lever-type signal generator. Slide regulators or rotary regulators or momentary-contact switches with a display can also be used.

On the whole, the present invention makes it possible to achieve an anti-jackknifing brake function electropneumatically without having to route compressed-air lines in the operator's cab for the purpose. This anti-jackknifing brake function can be implemented in the modulator for the parking brake, in which case either the spring-actuated parts of the combination spring-actuated/brake cylinders in the trailer or the service brake of the trailer are/is used for this purpose. However, the anti-jackknifing brake function can also be implemented by means of special valve devices, such as 3/2-way solenoid valves and holding valves, so that it is independent of the parking-brake modulator. For this purpose, pressure control in the trailer reservoir pressure line and/or pressure control in the control line for the brake pressure in the trailer can also be used to implement an anti-jackknifing brake function.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electrically controlled anti-jackknifing brake system of a tractor vehicle, said tractor vehicle being connectable to a trailer vehicle, said brake system operable to brake only brakes of said trailer vehicle, said anti-jackknifing brake system comprising a manually operable electrical operating element for actuating said brake system, said electrical operating element being operable to generate an electrical operating element signal to control a valve device of said tractor vehicle, said valve device being operable to adjust a brake reservoir pressure of said trailer vehicle to influence braking force of said brakes of said trailer vehicle, and said valve device being interposed in a trailer reservoir pressure line from at least one compressed-air reservoir tank of said tractor vehicle to a compressed-air reservoir tank of said trailer vehicle.

2. The brake system according to claim 1, wherein said valve device is a trailer control valve, and wherein said electrical operating element signal is at least one of (a) a data bus message and (b) transformable into a data bus message by at least one of (i) a parking brake modulator and (ii) a control device associated with said parking brake modulator and (iii) an electronic control unit, said brake system further comprising a brake-control module for controlling brake pressure in brakes of at least one of said tractor vehicle and said trailer vehicle, said brake-control module being constructed and arranged to evaluate said data bus message, generate an electrical anti-jackknifing brake control signal as a function of said data bus message and transmit said data bus message to said trailer control valve to influence braking force of said anti jackknifing brake.

3. The brake system according to claim 2, wherein said data bus message is a CAN data bus message transmitted via a CAN data bus.

4. The brake system according to claim 3, wherein said CAN data bus connects said electrical operating element and said brake-control module.

5. The brake system according to claim 3, wherein said CAN data bus connects said parking brake modulator and said brake-control module.

6. The brake system according to claim 3, wherein said electrical operating element includes an electronic module for generating said CAN data bus message.

7. The brake system according to claim 2, wherein said brake-control module is adapted to generate a status message representing at least one of implementation and non-implementation of braking demand by an operator of said tractor vehicle as indicated by means of said electrical operating element, said status message being signaled to said operator by means of a signal generator in a cab of said tractor vehicle.

8. The brake system according to claim 7, wherein said signal generator is at least one of an optical and acoustical type.

9. The brake system according to claim 2, wherein said brake-control module is an electronic brake system control module for electronically controlling brake pressures at said brakes.

10. The brake system according to claim 2, wherein said brake-control module is a control module of an anti-lock brake system including automatic traction control valves associated with said brakes.

11. The brake system according to claim 2, wherein said electrical operating element signal represents at least one of a braking-deceleration value and a brake-pressure value.

12. The brake system according to claim 2, wherein said data bus message is linked in said brake-control module with further messages processed in weighted form.

13. The brake system according to claim 1, wherein said valve device is controllable by a control device having an input for receiving a signal containing information as to a locked condition of wheels of said trailer vehicle, said control device being operable to transmit an electrical control device signal to said valve device to effect a reduction in said braking force as a function of said electrical control device signal.

14. The brake system according to claim 13, further comprising at least one spring-actuated brake cylinder of said trailer vehicle, said at least one spring-actuated brake cylinder of said trailer vehicle being pressurized as a function of said electrical control device signal.

15. The brake system according to claim 14, wherein said compressed-air reservoir tank of said trailer vehicle is pressurized as a function of said electrical control device signal.

16. The brake system according to claim 13, wherein said signal containing information as to a locked condition of wheels of said trailer vehicle is generated by an anti-lock system control unit of said trailer vehicle and is transmitted to said control device.

17. The brake system according to claim 13, wherein said control device is integrated in an anti-lock system control unit of said tractor vehicle.

18. The brake system according to claim 13, wherein said control device is integrated in a parking brake control unit.

19. The brake system according to claim 1, wherein said valve device occupies a first state when it is de-energized in which at least one spring-actuated brake cylinder of said trailer vehicle is vented.

20. The brake system according to claim 19, wherein said valve device occupies a second state when it is energized in which said trailer reservoir pressure line from said at least one compressed-air reservoir tank of said tractor vehicle to said compressed-air reservoir tank of said trailer vehicle is shut off to pneumatically isolate said at least one compressed-air reservoir tank of said tractor vehicle from said compressed-air reservoir tank of said trailer vehicle.

21. The brake system according to claim 20, wherein said valve device occupies a third state when it is further energized in which said trailer reservoir pressure line is open to place said at least one compressed-air reservoir tank of said tractor vehicle in pneumatic communication with said compressed-air reservoir tank of said trailer vehicle.

22. The brake system according to claim 21, wherein said valve device occupies a fourth state when it is further energized in which said at least one spring-actuated brake cylinder of said trailer vehicle is vented in a throttled manner.

23. The brake system according to claim 1, wherein said valve device is at least one of disposed in and integrated in an electropneumatic modulator for a parking brake implemented by at least one spring-actuated brake cylinder in at least one of said tractor vehicle and said trailer vehicle.

24. The brake system according to claim 23, wherein said braking force is generated by said at least one spring-actuated brake cylinder of said trailer vehicle.

25. The brake system according to claim 1, wherein said braking force of said anti jackknifing brake is generated by means of a service brake of said trailer vehicle.

26. The brake system according to claim 25, wherein said valve device for influencing braking force of said anti-jackknifing brake is in pneumatic communication with a control line from a brake-actuating device of said service brake to at least one brake cylinder of said service brake to raise brake pressure of said service brake in said control line upon actuation of said electrical operating element.

27. The brake system according to claim 1, wherein said electrical operating element is a slide.

28. The brake system according to claim 27, wherein said electrical operating element is a slide rheostat.

29. The brake system according to claim 1, wherein said electrical operating element is a rotary knob.

30. The brake system according to claim 29, wherein said electrical operating element is a rotary rheostat.

31. The brake system according to claim 1, wherein said electrical operating element signal is an analog signal, said electrical operating element being operable to adjust said electrical operating element signal in at least one of a continuously variable manner and in multiple stages.

32. The brake system according to claim 1, wherein said electrical operating element signal is a digital signal by which a plurality of different values are representable.

33. The brake system according to claim 1, wherein said valve device is an independent valve device.

34. The brake system according to claim 1, wherein said valve device is a 3/4-way solenoid valve.

35. The brake system according to claim 1, wherein said valve device is a double-armature solenoid valve.

36. The brake system according to claim 1, wherein said valve device includes both a 3/2-way solenoid valve and a 2/2-way solenoid valve.

37. The brake system according to claim 1, wherein said valve device for influencing braking force of said anti jackknifing brake includes a 4/2-way solenoid valve having four pneumatic ports and two states, and wherein, in a first, de-energized one of said two states, a trailer reservoir pressure line from at least one compressed-air reservoir tank of said tractor vehicle to a compressed-air reservoir tank of said trailer vehicle is controlled by means of a further valve with respect to pressure, and a control line from a brake-actuating device of a service brake of said trailer vehicle to at least one brake cylinder of said service brake for control of service brake pressure is not influenced, and wherein, in a second, energized one of said two states, said trailer reservoir pressure line is in pneumatic communication with said at least one compressed-air reservoir tank of said tractor vehicle, and said control line is pressurized with compressed air from said at least one compressed-air reservoir tank of said tractor vehicle by means of said further valve.

38. The brake system according claim 1, wherein said electrical operating element is a multi-position lever.

* * * * *